(12) United States Patent
Hoshino et al.

(10) Patent No.: US 10,569,373 B2
(45) Date of Patent: Feb. 25, 2020

(54) BOLT CAULKING METHOD AND BOLT CAULKING DEVICE

(71) Applicant: AOYAMA SEISAKUSHO CO., LTD., Niwa-Gun (JP)

(72) Inventors: Naoki Hoshino, Niwa-Gun (JP); Toshiya Mori, Niwa-Gun (JP); Yukinori Fujimoto, Niwa-Gun (JP)

(73) Assignee: Aoyama Seisakusho Co., Ltd., Niwa-Gun (JP)

( * ) Notice: Subject to any disclaimer, the term of this patent is extended or adjusted under 35 U.S.C. 154(b) by 230 days.

(21) Appl. No.: 15/450,499

(22) Filed: Mar. 6, 2017

(65) Prior Publication Data
US 2017/0304969 A1    Oct. 26, 2017

(30) Foreign Application Priority Data

Apr. 25, 2016 (JP) .................. 2016-086664

(51) Int. Cl.
*B23P 19/06*  (2006.01)
*B23P 19/00*  (2006.01)
*F16B 37/06*  (2006.01)

(52) U.S. Cl.
CPC .......... *B23P 19/064* (2013.01); *B23P 19/005* (2013.01); *B23P 19/006* (2013.01); *F16B 37/068* (2013.01)

(58) Field of Classification Search
CPC ..... B23P 19/002; B23P 19/005; B23P 19/006; B23P 19/062–064; B23P 19/001; B23P 19/06; B21J 15/041; B21J 15/02; B21J 15/32; B21J 15/10; Y10T 29/5377–53774; F16B 5/0208; F16B 37/068; F16B 39/282
See application file for complete search history.

(56) References Cited

U.S. PATENT DOCUMENTS 5,779,127 A * 7/1998 Blacket .................. B21J 15/025
                                                            227/107
5,895,584 A * 4/1999 Sakota .................. B23K 11/315
                                                            219/86.24
(Continued)

FOREIGN PATENT DOCUMENTS

DE    102009044888 A1 *  6/2011  ............ B21J 15/025
EP         0 703 037 A1    3/1996
(Continued)

OTHER PUBLICATIONS

Japanese Office Action (with English translation), Japanese Application No. 2016-086664, dated Sep. 24, 2019 (8 pages).

*Primary Examiner* — Matthew P Travers
(74) *Attorney, Agent, or Firm* — Burr & Brown, PLLC (57) ABSTRACT

There are provided a bolt caulking method and a bolt caulking device which ensure supply and caulking of a bolt as a single operation. The method is a bolt caulking method including supplying a bolt into a nose piece having a vertical hole, and lowering a punch from above to drive the bolt into a metal plate. The bolt is supplied through a pipe connected to a side of the nose piece, and dropped into a vertical hole formed in the nose piece along an inclined hole formed at a tip end of the pipe with a head part of the bolt being located on the topside. Thereafter, the punch which ejects air from a central hole is lowered within the vertical hole to drive the bolt into a metal plate while holding the bolt at a lower part of the vertical hole by the ejecting air flow.

3 Claims, 6 Drawing Sheets

(56) References Cited

U.S. PATENT DOCUMENTS

| | | | |
|---|---|---|---|
| 6,592,015 B1 * | 7/2003 | Gostylla | B21J 15/025 |
| | | | 227/107 |
| 2002/0078557 A1 * | 6/2002 | Watanabe | B23P 19/006 |
| | | | 29/714 |
| 2005/0056683 A1 * | 3/2005 | Miura | B23K 11/0053 |
| | | | 228/47.1 |
| 2005/0284910 A1 * | 12/2005 | Craythorn | B21J 15/32 |
| | | | 227/112 |
| 2009/0162182 A1 * | 6/2009 | Kusano | B23K 11/0053 |
| | | | 414/797.4 |

FOREIGN PATENT DOCUMENTS

| | | |
|---|---|---|
| JP | S56-126379 U | 9/1981 |
| JP | H05-138569 A | 6/1993 |
| JP | 08-090360 A1 | 4/1996 |
| JP | 2007-144493 A | 6/2007 |
| JP | 2015-071211 A | 4/2015 |

\* cited by examiner

Fig. 1

Prior Art

Fig. 2

Prior Art

BOLT CAULKING METHOD AND BOLT CAULKING DEVICE

FIELD OF THE INVENTION

The present invention relates to a bolt caulking method and a bolt caulking device each used to caulk a bolt to a metal plate. The bolt covered by the present invention is a bolt called caulking bolt, but, herein, is referred to merely as "bolt."

BACKGROUND OF THE INVENTION

Figure 1:
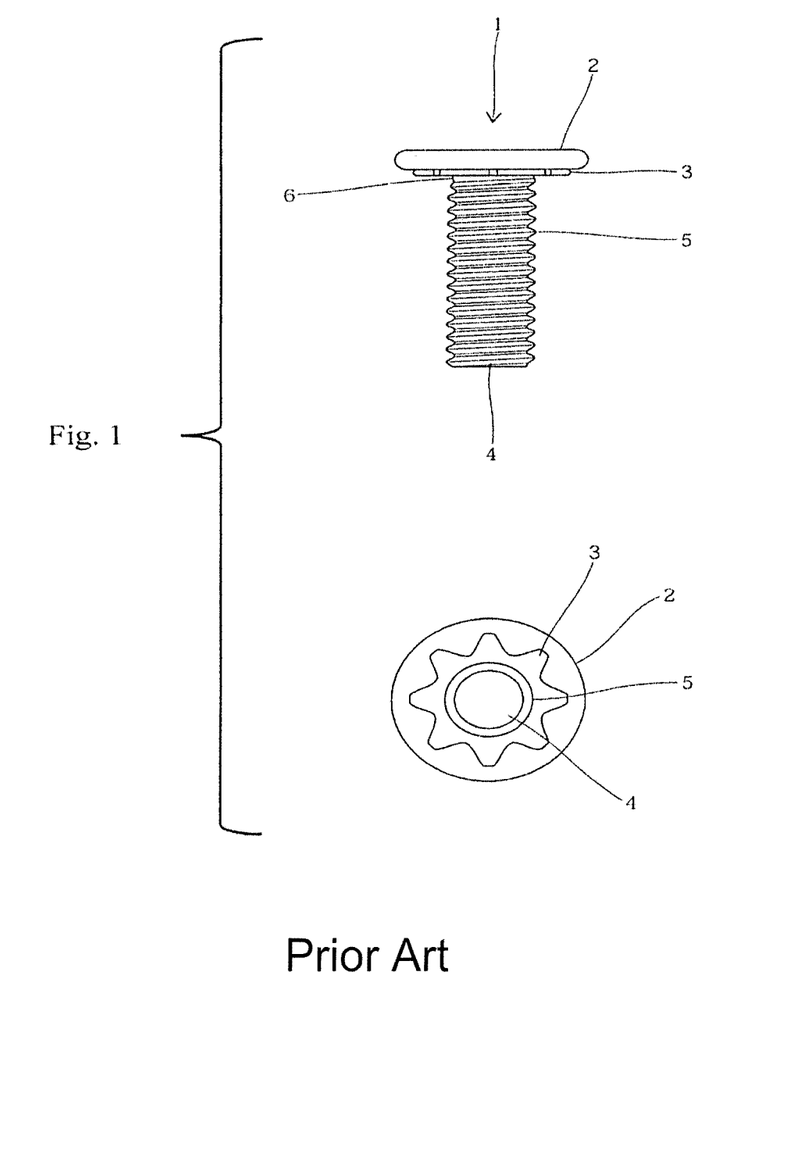
FIG. 1 includes a front view and a bottom view each showing the shape of a caulking bolt.
Figure 2:
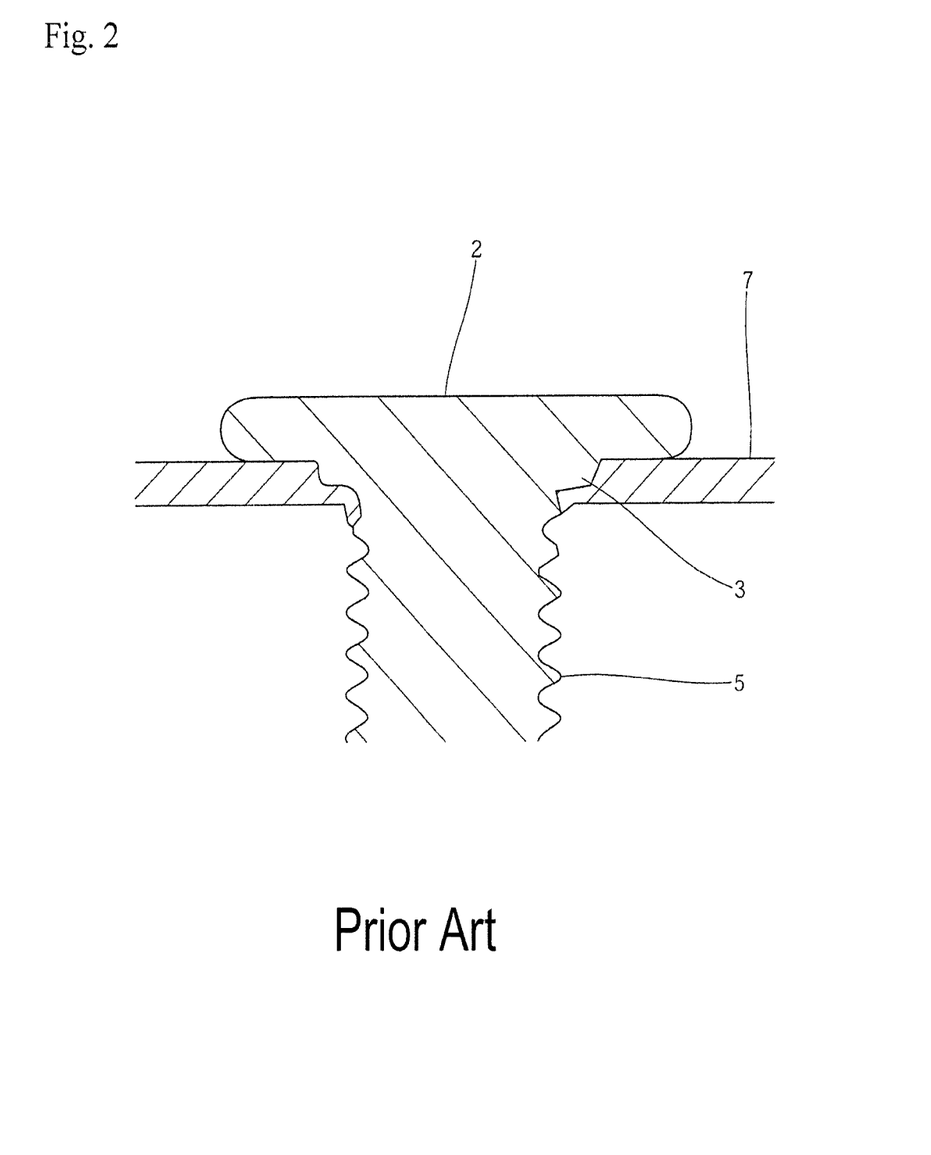
FIG. 2 is a sectional view showing a state where the bolt has been caulked to a metal plate.

A bolt 1 called caulking bolt includes a protrusion 3 on a seat surface which is a lower surface of a bolt head part 2 as shown in FIG. 1, and also includes a screwless part or small-diameter part 6 provided at the upper end of a male part 5 formed in a shaft part 4. When this bolt 1 is driven into a metal plate 7 as shown in FIG. 2, the metal plastically flows into the outer periphery of the protrusion 3 and the screwless part or small-diameter part 6, so that the bolt 1 is caulked and fixed to the metal plate 7. Thereafter, the bolt can be used to attach other members, as with stud bolts.

Such a bolt is set in a prepared hole formed in the metal plate 7 by a human hand or robot hand, and then caulked by a caulking device provided with a punch. However, when the number of the bolts used is increased, there is demanded a technique of supplying the bolts into a progressive mold to perform supply and caulking as a single operation, not such two-stage operation.

The device which performs supply and caulking as a single operation in such a manner has already been put in practical use for caulking nuts. The details of the device are as taught by JP H8-90360 A of the present applicant, and a caulking nut is supplied in a horizontal posture (posture where the axis is perpendicular) by air pressure from the lateral direction relative to a caulking device, and driven into a metal plate below by a punch lowering from above.

A bolt, however, is vertically long unlike a flat nut, and thus cannot be supplied in a posture where the axis is perpendicular similarly as in JP H8-90360 A. Since a vertically-long bolt must be driven into a metal plate in a state where the bolt is kept vertical to the metal plate, the posture of the bolt cannot be easily held as compared with that of the nut. Also for these reasons, any caulking technique that ensures supply and caulking as a single operation has not been put in practical use so far.

CITATION LIST

Patent Literature

Patent Literature 1: JP H8-90360 A

SUMMARY OF INVENTION

Problem to be Solved by the Invention

Accordingly, an object of the present invention is to provide a bolt caulking method and a bolt caulking device which can solve the above conventional problem and enable a bolt to be supplied into a progressive mold to perform supply and caulking of the bolt as a single operation.

Means for Solving the Problems

The bolt caulking method of the present invention, which has been made to solve the above problem, is a bolt caulking method of supplying a bolt into a nose piece having a vertical hole, and lowering a punch from above to drive the bolt into a metal plate, the method including:

supplying a bolt through a pipe connected to a side of a nose piece;

dropping the bolt into a vertical hole formed in the nose piece along an inclined hole formed at a tip end of the pipe with a head part of the bolt being located on the topside; and then, lowering a punch which ejects air from a central hole within the vertical hole to drive the bolt into a metal plate while holding the bolt at a lower part of the vertical hole by the ejecting air flow.

The bolt can be moved within the pipe by negative pressure generated by the air flow ejecting from the central hole of the punch. Also, the bolt can be held by openable/closable bolt guides provided at a lower part of the nose piece, and also can be driven into the metal plate by pushing and expanding the bolt guides with lowering of the punch. In this case, even while the bolt guides are being pushed and expanded, the bolt is preferably held at a tip end of the punch by adsorption force generated by the air flow ejecting from the central hole of the punch.

The bolt caulking device of the present invention, which has been made to solve the above problem, is a bolt caulking device including:

a nose piece having a vertical hole;

a pipe connected to a side of this nose piece to supply the bolt to the nose piece;

an inclined hole formed in a connection part between this pipe and the nose piece to drop the bolt into the vertical hole with a head part of the bolt being located on the topside;

a punch which is provided with a central hole for ejecting air and which moves up and down within the vertical hole;

openable/closable bolt guides holding the bolt at a lower part of the vertical hole; and a lifting mechanism moving all of them up and down relative to a metal plate mounted below.

Advantageous Effects of Invention

According to the present invention, the bolt is moved in a horizontal posture (posture where the axial line is horizontal) through the pipe connected to a side of the nose piece, and dropped into the vertical hole formed in the nose piece along the inclined hole formed at a tip end of the pipe with a head part of the bolt being located on the topside. Thereafter, the punch is lowered within the vertical hole to drive the bolt into the metal plate while holding the bolt at a lower part of the vertical hole by the ejecting air flow. Therefore, the bolt can be caulked to the metal plate, by a single operation, in a state where the posture of the bolt is maintained correctly.

DETAILED DESCRIPTION OF THE INVENTION (Overall Structure)

Figure 3:
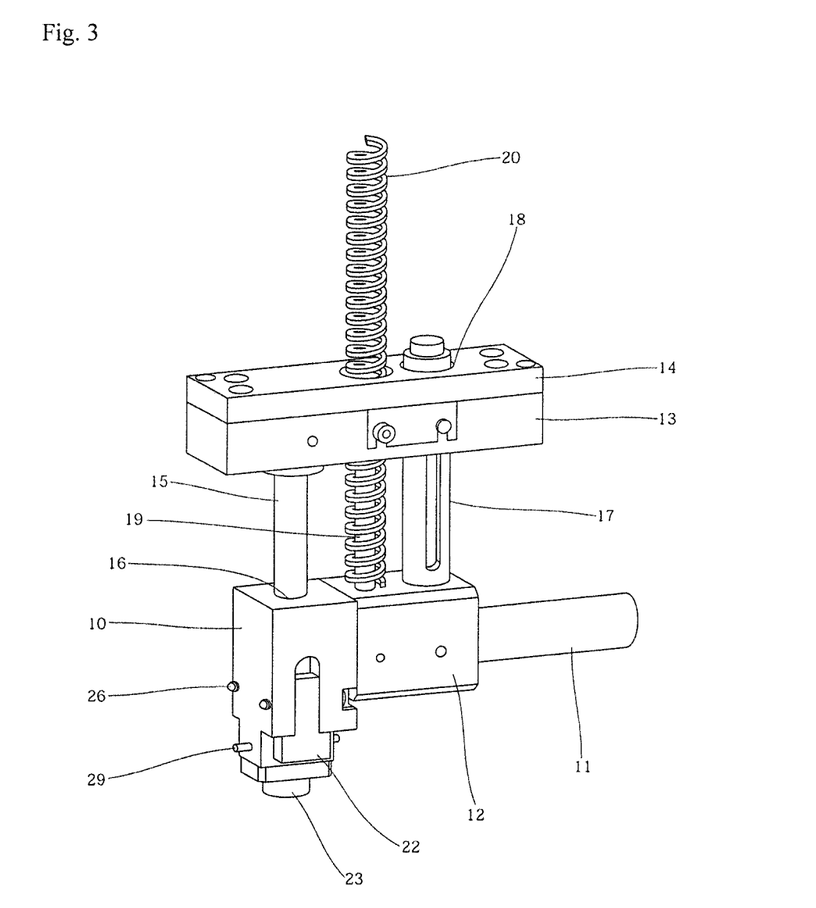
FIG. 3 is a perspective view showing an appearance of a caulking device according to an embodiment.

FIG. 3 is an appearance perspective view showing a caulking device according to an embodiment of the present invention, in which reference numeral 10 denotes a nose piece and reference numeral 11 denotes a pipe for supplying a bolt 1 to the nose piece 10. A tip end of this pipe 11 is coupled to a side wall of the nose piece 10 via a coupling block 12.

Reference numeral 13 denotes a punch retainer positioned above the nose piece 10, and reference numeral 14 denotes a backup plate. The punch retainer 13 is provided with a round rod-shaped punch 15 which protrudes downward. As shown in FIGS. 4(A) to 4(D), the nose piece 10 is provided with a vertical hole 16, and the punch 15 can be inserted into the vertical hole 16 to move up and down therein.

A guide post 17 is provided between the nose piece 10 and coupling block 12 and the punch retainer 13. An upper part of the guide post 17 passes through a through hole 18 of the punch retainer 13, and the nose piece 10 and the punch retainer 13 can be moved relatively. Also, a compression spring 20, which is guided by a spring guide 19, is provided between the nose piece 10 and coupling block 12 and the punch retainer 13.

As shown in FIGS. 4(A) to 4(D), a lifting mechanism 21 such as a press machine is provided further above the punch retainer 13, and the upper end of the compression spring 20 is brought in contact with this lifting mechanism 21. Also, the punch retainer 13 is fixed to a lower side of the lifting mechanism 21 by a post 25. Therefore, the punch retainer 13 moves up and down integrally with the lifting mechanism 21, but the nose piece 10 and the coupling block 12 are slidable relative to the punch retainer 13, and are always brought in a state where they are pushed out downward by the compression spring 20.

The nose piece 10 has, at its lower end, bolt guides 22 and a chip base 23. As will be described below, the bolt guides 22 are each intended to hold the bolt 1 at the lower end of the vertical hole 16 formed in the nose piece 10. Further, the chip base 23 is a member which abuts against the metal plate 7 into which the bolt 1 is driven. When all the members are lowered by the lifting mechanism 21, the chip base 23 firstly abuts against the metal plate 7 and eliminates its warpage. Further, when the lifting mechanism 21 lowers while compressing the compression spring 20, the punch 15 lowers within the vertical hole 16 of the nose piece 10 to drive the bolt 1 into the metal plate 7.

(Supply of Bolt)

As shown in FIGS. 4(A) to 4(D), the bolt 1 is supplied through the pipe 11 to the nose piece 10. The bolt 1 is in a posture where the axial line is horizontal, and moves through the pipe 11 with the head part 2 thereof being located on the backside. As shown in FIGS. 4(A) to 6(C), a central hole 30 is formed in the punch 15, and compressed air supplied from an air supply hole (not shown) formed at an upper part thereof into the central hole 30 is ejected downward. Therefore, negative pressure is generated in the nose piece 10, so that the bolt 1 is sucked up to the nose piece 10 by this negative pressure. However, the bolt 1 can also be pressure-fed within the pipe 11 by air pressure in a conventional manner.

Figure 4:
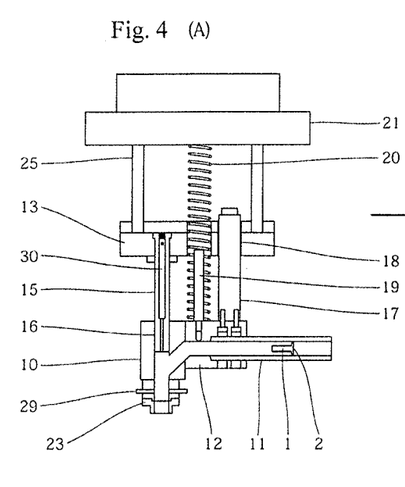
FIGS. 4(A) to 4(D) are sectional views showing a bolt supplying step.

An inclined hole 24 is formed in a connection part between this pipe 11 and the nose piece 10, and the bolt 1 is changed in direction by this inclined hole 24 as shown in FIGS. 4 (B) and 4(C), and dropped into the vertical hole 16 of the nose piece 10 with the head part 2 thereof being located on the topside as shown in FIG. 4 (D). The compressed air ejected from the central hole 30 of the punch 15 described above is used to push the bolt 11 onto a lower part of the vertical hole 16 formed in the nose piece 10.

Figure 5:
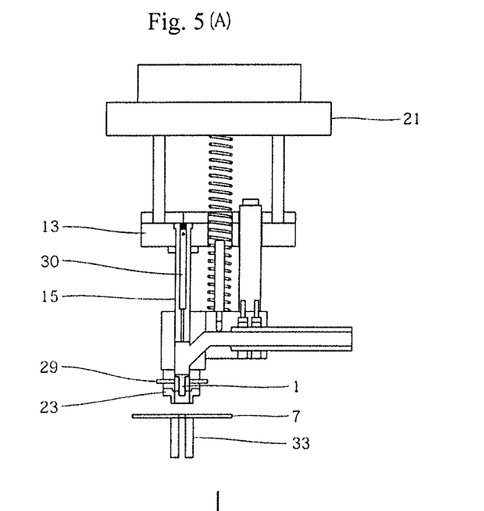
FIGS. 5(A) to 5(C) are sectional views showing a bolt driving step.
Figure 6:
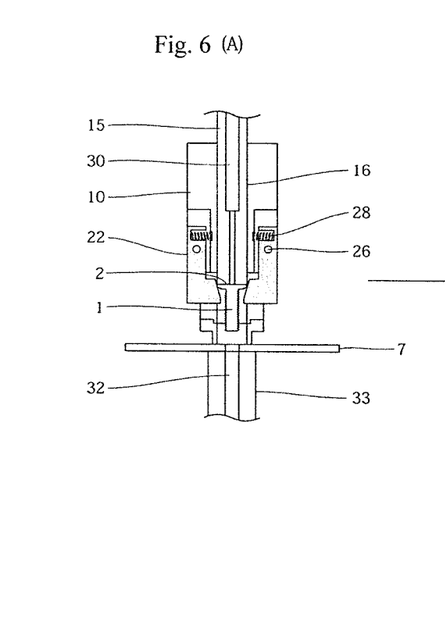
FIGS. 6(A) to 6(C) are sectional views of an essential part showing the bolt driving step.

As shown in FIGS. 6(A) to 6(C), the bolt guides 22 are each provided at a lower part of the nose piece 10. Incidentally, the cut plane in each of FIGS. 6(A) to 6(C) is a plane orthogonal to the cut plane in each of FIGS. 4(A) to 4(D) and 5(A) to 5(C). The bolt guides 22 are each composed of a pair of arms openable/closable around a pin 26, and are normally in a close state as shown in FIG. 6 (A) by a spring 28 provided at an upper part relative to the pin 26. Therefore, the bolt 1 dropped into the vertical hole 16 is brought in a state where the head part 2 thereof is held by the pair of arms of the respective bolt guides 22. Incidentally, a sensor 29 is provided on the nose piece 10 to detect whether the bolt 1 has been surely fed into a position shown in FIG. 4 (D).

(Driving of Bolt)

After the bolt 1 has been held by the bolt guides 22 as described above, the lifting mechanism 21 lowers all the members, as shown in FIG. 5 (A). The metal plate 7 is set on the upper surface of a die 33 which is provided with a through hole 32.

Further, when the lifting mechanism 21 lowers so that the chip base 23 at the lower end of the nose piece 10 abuts against the metal plate 7, the nose piece 10 cannot move down any more. However, since the punch retainer 13 further lowers while compressing the compression spring 20 as shown in FIG. 5 (B), the punch 15 fixed to the punch retainer 13 lowers within the vertical hole 16 of the nose piece 10 to press the head part 2 of the bolt 1.

At this time, the pair of bolt guides 22 are pushed and expanded by the head part 2 of the bolt 1 as shown in FIG. 6 (B), and the bolt 1 is driven into the metal plate 7 as shown in FIG. 5 (C) and FIG. 6 (C). At this time, the lower surface of the punch 15 is brought very close to the head part 2 of the bolt 1, and the compressed air ejected from the lower end of the central hole 30 formed in the punch 15 passes through a narrow flow path between the punch 15 and the head part 2 of the bolt 1 and is discharged to the periphery. Therefore, the flow rate of air becomes very high in the portion of the head part 2 of the bolt 1, and adsorption force is generated by the Venturi effect. As a result of this, even while the pair of bolt guides 22 are being pushed and expanded by the head part 2 of the bolt 1, the bolt 1 moves toward the metal plate 7 as shown in FIG. 6 (C) in a state where the bolt 1 is adsorbed and held at a tip end of the punch 1. Thus, the bolt 1 is driven into the metal plate 7 while its correct posture is maintained. Thereafter, the lifting mechanism 21 elevates, and, thereafter, a similar cycle is repeated.

In the present invention, the compressed air ejected from the central hole 30 formed in the punch 15 is utilized to control the posture of the bolt 1 as described above, and air suction is not carried out. Therefore, the present invention is advantageous in that no foreign matter is sucked.

CONCLUSION

As described above, according to the present invention, it is possible to supply the bolt 1 into the vertical hole 16 of the nose piece 10 when the nose piece 10 is in an elevated position and to lower the nose piece 10, thereby driving the bolt 1 into the metal plate 7. Since the bolt can be caulked to the metal plate by a single operation in this manner, the present invention is advantageous in that the operation of caulking the bolt 1 can be efficiently performed even when the number of the bolts used is increased.

REFERENCE SIGNS LIST

1: Bolt
2: Bolt head part
3: Protrusion
4: Shaft part
5: Male part
6: Screwless part or small-diameter part
7: Metal plate
10: Nose piece
11: Pipe
12: Coupling block
13: Punch retainer
14: Backup plate
15: Punch
16: Vertical hole
17: Guide post
18: Through hole
19: Spring guide
20: Compression spring
21: Lifting mechanism
22: Bolt guide
23: Chip base
24: Inclined hole
25: Bolt guide
26: Pin
28: Spring
29: Sensor
30: Central hole
31: Post
32: Through hole
33: Die

The invention claimed is:

1. A bolt caulking method of supplying a bolt into a nose piece having a vertical hole, and lowering a punch from above to drive the bolt into a metal plate, the method comprising:
   supplying a bolt through a pipe connected to a side of a nose piece;
   dropping the bolt into a vertical hole formed in the nose piece along an inclined hole formed at a tip end of the pipe with a head part of the bolt being located on a topside; and
   then, a punch which ejects air from a central hole is lowered within the vertical hole to drive the bolt into a metal plate while holding the bolt at a lower part of the vertical hole by the ejecting air flow, wherein the bolt is moved within the pipe by negative pressure generated by the air flow ejecting from the central hole of the punch.

2. The bolt caulking method according to claim 1, wherein the bolt is held by openable/closable bolt guides each provided at the lower part in the vertical hole, and driven into the metal plate by pushing and expanding the bolt guides with lowering of the punch.

3. The bolt caulking method according to claim 2, wherein even while the bolt guides are being pushed and expanded, the bolt is held at a tip end of the punch by adsorption force generated by the air flow ejecting from the central hole of the punch.

\* \* \* \* \*